Dec. 5, 1967  E. R. LOHNEIS  3,355,797
MACHINE TOOL WITH A TOOL CHANGER
Filed July 27, 1966  4 Sheets-Sheet 1

INVENTOR.
EARL R. LOHNEIS
BY Robert C. Jones

Dec. 5, 1967   E. R. LOHNEIS   3,355,797
MACHINE TOOL WITH A TOOL CHANGER
Filed July 27, 1966   4 Sheets-Sheet 2

INVENTOR.
EARL R. LOHNEIS
BY

United States Patent Office 3,355,797
Patented Dec. 5, 1967

3,355,797
MACHINE TOOL WITH A TOOL CHANGER
Earl R. Lohneis, Milwaukee, Wis., assignor to Kearney & Trecker Corporation, West Allis, Wis., a corporation of Wisconsin
Filed July 27, 1966, Ser. No. 568,238
8 Claims. (Cl. 29—568)

ABSTRACT OF THE DISCLOSURE

A plurality of tools are carried in storage for use in the spindle of a machine tool. The storage magazine comprises a rotatable ring having a plurality of independently rotatable storage turrets, each of which carries a plurality of tools. Each turret is moved into a tool change station once in each complete revolution of the magazine. After the individual turret is moved out of the tool change station and prior to its next appearance in the tool change station the turret will be indexed so that another tool carried by the particular turret is moved into a position where it will be available for transfer to the machine spindle when the turret is again positioned at the tool change station. Provision has also been made whereby the absence of a tool in the ready position of a turret being moved into the tool change station is sensed and the rotation of the magazine is continued to position the next adjacent turret in the tool change station.

---

It is a general object of this invention to provide a tool changer mechanism having an extremely large capacity tool storage magazine that is adapted to be used for storing tools in sequential order of use.

Another object of this invention is to provide a tool change mechanism having a tool storage magazine of greatly increased capacity in relation to its overall size.

Still another object of this invention is to provide a tool change mechanism having a multiple turret tool storage magazine.

Yet another object of this invention is to provide a tool change mechanism having a tool storage magazine presenting a plurality of independently indexable tool storage turrets which rotate bodily with the magazine and also independently relative to the magazine for moving a plurality of tools successively into a tool change station.

A further object of this invention is to provide a tool change mechanism having an indexable tool storage magazine presenting a plurality of individual movable groups of tool storage receptacles adapted to store an intermixed selection of small diameter tools and relatively larger diameter tools.

Yet another object of the present invention is to provide a tool change mechanism having a tool storage magazine that is provided with a plurality of storage receptacles arranged in groups in which large diameters tools may be stored without the necessity of providing empty storage spaces on either side of a storage space in which a large diameter tool is stored.

A still further object of this invention is to provide a tool change mechanism having a tool storage magazine which is indexable from tool to tool rather than from storage position to storage position, thereby eliminating the necessity of programming empty tool storage positions.

Another object of this invention is to provide a tool change mechanism having a tool storage magazine provided with a plurality of individually indexable tool storage turrets capable of storing an intermixture of small diameter and relatively large diameter tools, and which requires a minimum number of coacting parts having a minimum of controlled movements required to position a tool at a tool change station.

According to this invention, there is provided an improved and simplified tool change mechanism for changing diverse tools that are used in a spindle of a machine tool. The machine tool includes an indexable tool storage magazine having a plurality of stored tools and a tool changer mechanism that is carried in bodily spaced relationship relative to the storage magazine and the spindle or tool operator. The tool change mechanism is operative to effect an interchange of tools between the storage magazine and the tool receiving spindle.

The storage magazine is arranged to rotate to present individual ones of a plurality of turrets in succession at a tool change station. Each turret is provided with a plurality of tool storage receptacles or positions adapted to receive and store diverse tools of varying diameters. The turrets are supported in the magazine for individual indexable rotational movement about axes which are disposed in the same horizontal plane and which extend radially outwardly from the axis about which the magazine rotates. With his arrangement, a greater tool carrying capacity is realized due to the fact that tool storage in each turret is in different horizontal planes, and therefore, the spacing between storage spaces need not provide for the arcuate swing of the tool changer in gripping a selected tool. By reason of the compact association of a plurality of tool storage sockets or receptacles arranged in clusters or groups, an increase in the tool storage capacity of the magazine without an increase in the diameter of the magazine is realized. The selected tool is located in the tool change station by an indexing movement of the magazine to bring the turret in which the particular desired tool is stored into the tool change station. The particular turret in which the desired tool is stored is indexed to position the desired tool in the proper plane for subsequent engagement by the tool changer as the turret moves with the magazine. Thus, the magazine operates to place the turret at the tool change station and the independent indexing movement of the turret serves to place the desired tool in position to be engaged by the tool change arm of the tool changer mechanism.

The foregoing and other objects of this invention, which will become more fully apparent from the following detailed description, may be achieved by the exemplifying apparatus depicted and set forth in the specification in connection with the accompanying drawings, in which:

Figure 1:
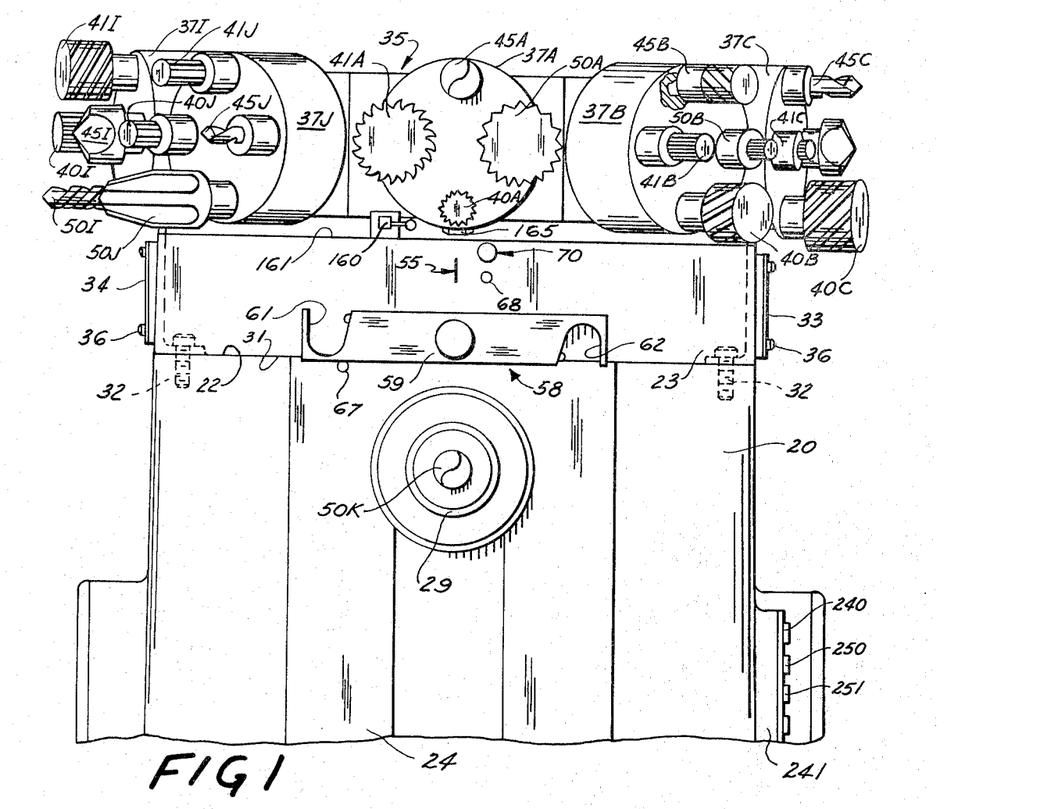
FIGURE 1 is a view in front elevation of the upper portion of a machine tool showing the tool changer mechanism and tool storage magazine of the present invention in operative position on the machine column.

Reference is now made to the drawings, and more specifically to FIG. 1 thereof, illustrating the machine tool incorporating the features of the present invention. As there shown, the machine presents a hollow vertical column 20 upstanding from a base (not shown) and having an upper flat machined surface 22 on which a tool storage magazine support housing 23 is secured. The front face of the column 20 is provided with vertical way surfaces 24 on which the usual knee, saddle and table arrangement (not shown) is supported for movement to establish the position of a workpiece (not shown) with respect to a spindle 29. Power operable means (not shown) disposed within the lower portion of the column 20 are connected to effect selective relative movement of the table, saddle and knee (not shown), in a well-known manner, so that relative movement between a workpiece and the rotatable tool receiving spindle 29 may be effected. The magazine support housing 23 is provided with a complementary flat machined surface 31, which is disposed in abutting relationship on the machined column surface 22, being secured in place by means of bolts 32. Access to the interior of the hollow magazine support housing 23 is had through access openings provided on either side of the housing which are closed by coverplates 33 and 34 that are retained in position by means of screws 36. The housing 23 rotatably supports a tool storage magazine or drum 35 for rotation about a vertical axis. The magazine is provided with a plurality of indexable tool supporting members or turrets 37 which are supported in equal spaced relationship about the periphery of the drum 35 for individual index movement about horizontally radially extending axes. Each turret 37 is provided with equally spaced bored openings 38 formed therein and constituting a storage socket or tool support for carrying tools, such as tools 40, 41, 45 and 50 illustrated in FIG. 1, which are selectively moved into a tool change station generally identified by the reference numeral 55. Each bored opening or tool socket 38 is formed in the turrets 37 adjacent to the peripheral edge of the turret and in a manner so that its axis is parallel to the axis about which the turret rotates. The tool storage sockets 38 in each turret are equally spaced angularly from each other so as to provide a maximum angular spacing between adjacent tools to thereby provide for the storage of tools having relatively large diameter cutters, as exemplified by the tools 40A, 41A and 50A stored in the turret 37A. With the compact cluster or group arrangement of a plurality of tool storage positions or sockets presented by each turret, the versatility of the storage magazine is increased not only from the standpoint of the increased number of tools that may be stored therein as compared to the storage capacity of prior art tool storage magazines, but also from the standpoint of being able to accommodate larger diameter tools without the necessity of providing empty storage sockets on either side of such large diameter tools.

In adition to the magazine 35, the frame or housing 23 also supports a tool change mechanism or tool transfer device generally identified by the reference numeral 58. The tool change mechanism 58 comprises essentially a carrier or tool change arm 59 presenting semicircular tool gripping recesses 61 and 62 at opposite ends thereof.

The arm 59 is secured to the outer end of a shaft 63 in bodily spaced relationship relative to the storage magazine 35 and the tool receiving spindle 29. The spindle 29 is rotatably driven by power means (not shown) and is adapted to perform a machining operation with any of the diverse tools 40, 41, 45 and 50 which are successively located at the tool change station 55 for individual transfer to the spindle by operation of the tool change arm 59. To selectively limit the rotary movements of the tool carrier or tool change arm 59, a pair of fixed stops 67 and 68 are secured to the front face of the column 20, and in addition thereto, an axially movable stop 70 is operably carried by the column. With the coordinated movements of the magazine 35 and its associated turrets 37, the tool change arm 59 and the axial movable stop 70, and with the aid of the fixed stops 67 and 68, tools are automatically interchanged between the storage magazine and the tool spindle 29.

Figure 9:
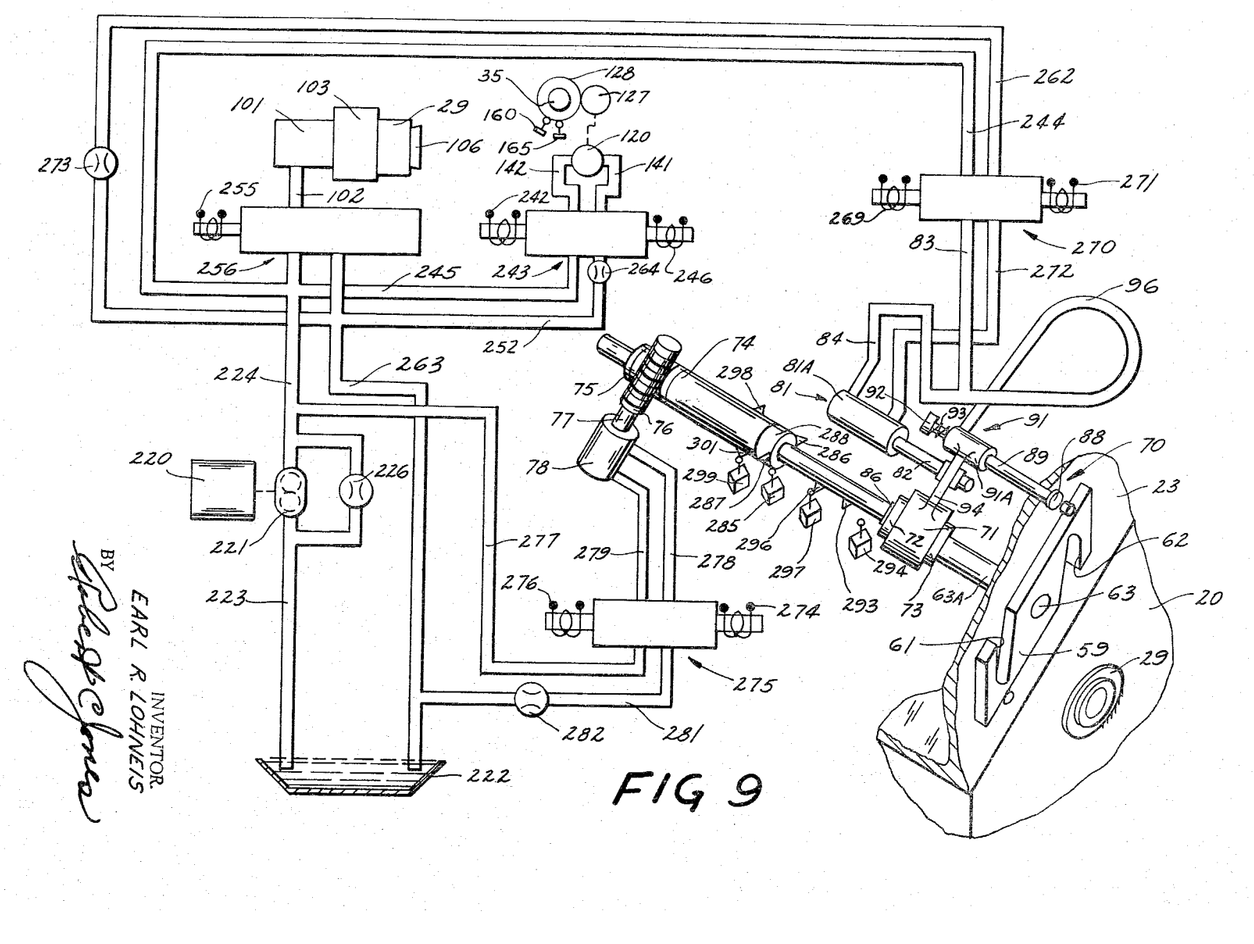

The mounting arrangement of the tool change arm 59 and the movable stop 70 in the housing 23 is schematically illustrated in the hydraulic diagram of FIG. 9. As schematically shown in FIG. 9, the operative cooperating elements are disposed so that the arm 59 is secured to the outer end of the shaft 63, the latter being disposed in the housing 23, being supported therein for axial and rotatable movement. The shaft 63 extends inwardly into the interior of the column 20 and passes through an axially movable block 71 being journaled therein in a pair of bearings 72 and 73. The extreme rearward end of the shaft 63 is disposed within a driving sleeve 74 which is supported within the housing 23 for rotation but constrained from moving axially in a manner that a drive connection between the sleeve 74 and the shaft 63 is maintained for any axial position of the shaft 63. The extreme rearward end 75 of the sleeve 74 is provided with peripheral gear teeth that are in meshing engagement with a worm gear 76, the latter being secured to the outer extending end of a drive shaft 77 of a hydraulic motor 78 that is operatively disposed within the housing 23.

Axial movement of the tool change arm 59 is effected by means of a hydraulic power actuator 81 comprising a cylinder 81A which is bolted or otherwise secured within the housing 23 and a cooperating axially movable piston rod 82 which is secured to a laterally extending bracket portion 94 of the block 71. To move the arm 59 to an extended position away from the front face of the column 20, the associated shaft 63 is moved axially outwardly, as viewed in FIG. 9. To this end, hydraulic pressure fluid is supplied to the actuator 81 by means of hydraulic lines 83 and 84 which effect rightward or outward movement of the piston rod 82 relative to the cylinder 81A. Since the piston rod 82 is secured to the block 71 which, in turn, is operably connected to effect axial movement of the shaft 63, the outward axial movement of the piston rod 82 is imparted to the shaft 63 via the block 71. This is accomplished by reason of the inner race of the bearing 73 being disposed in abutting relationship to the axial end face of the large diameter portion 63A of the shaft 63. On the other hand, to provide a connection for retracting the shaft 63 for moving it inwardly, a snap ring 86 is operatively connected to the shaft 63 and disposed in engagement with the inner race of the bearing 72.

Simultaneously, with the outward movement of the arm 59 and shaft 63, the movable stop 70 is moved axially outwardly both with and relative to the shaft 63 and arm 59. The movable stop 70 comprises an external head portion 88 which is secured to the outwardly extending end of a shaft 89 that extends inwardly into the housing 23 and through a cylinder 91A of a hydraulic actuator 91 to cooperate with a piston (not shown) operatively contained within the cylinder 91A. The cylinder 91A is connected to move with the block 71 by means of the bracket 94 to which the shaft 82 of the actuator 81 is secured.

To move the shaft 89 outwardly, the cylinder 91A is connected via a flexible line 96 to the line 83 to receive hydraulic pressure fluid simultaneously with the power actuator 81. To retain the shaft 89 in a retracted position whenever the cylinder 91A is connected to drain, the shaft 89 is arranged to extend outwardly of the cylinder 91A to the rear thereof with the extreme outer end of the shaft being provided with a button or flange 92. A spring 93 is mounted on the extending end of the shaft 89 with one end abutting the cylinder 91A and its opposite end abutting the button 92.

Whenever hydraulic pressure fluid is connected to actuate the power actuator 81, pressure fluid also flows via the flexible line 96 to the cylinder 91A to effect outward movement of the shaft 89 until the flanged head 88 of the stop abuts the inner surface of the arm 59. After the arm 59 is rotated out of engagement with the head 88 of the stop 70, the movable stop is then urged outwardly a slightly further distance until it reaches its limit of outward movement and is fully extended. In this position of the movable stop 70, the tool change arm 59 will engage the flanged head 88 upon completion of 180° of rotary movement of the arm in the extended position.

The tool spindle 29 is rotatably carried by the column 20 in bodily spaced relationship relative to the carrier arm 59 such that the axis of the spindle and the longitudinal axis of either the grip 61 or the grip 62 coincide whenever the tool change arm 59 is pivoted from its horizontal parked position to a vertical tool engaging position. The spindle 29 is driven in well-known manner by a variable speed transmission mechanism (not shown) which is selectively connectible to drive the spindle at a selected desired speed. The tools are clamped in the spindle 29 in operating position by an automatically operable collet 106.

Figures 4, 5, 6, 7:
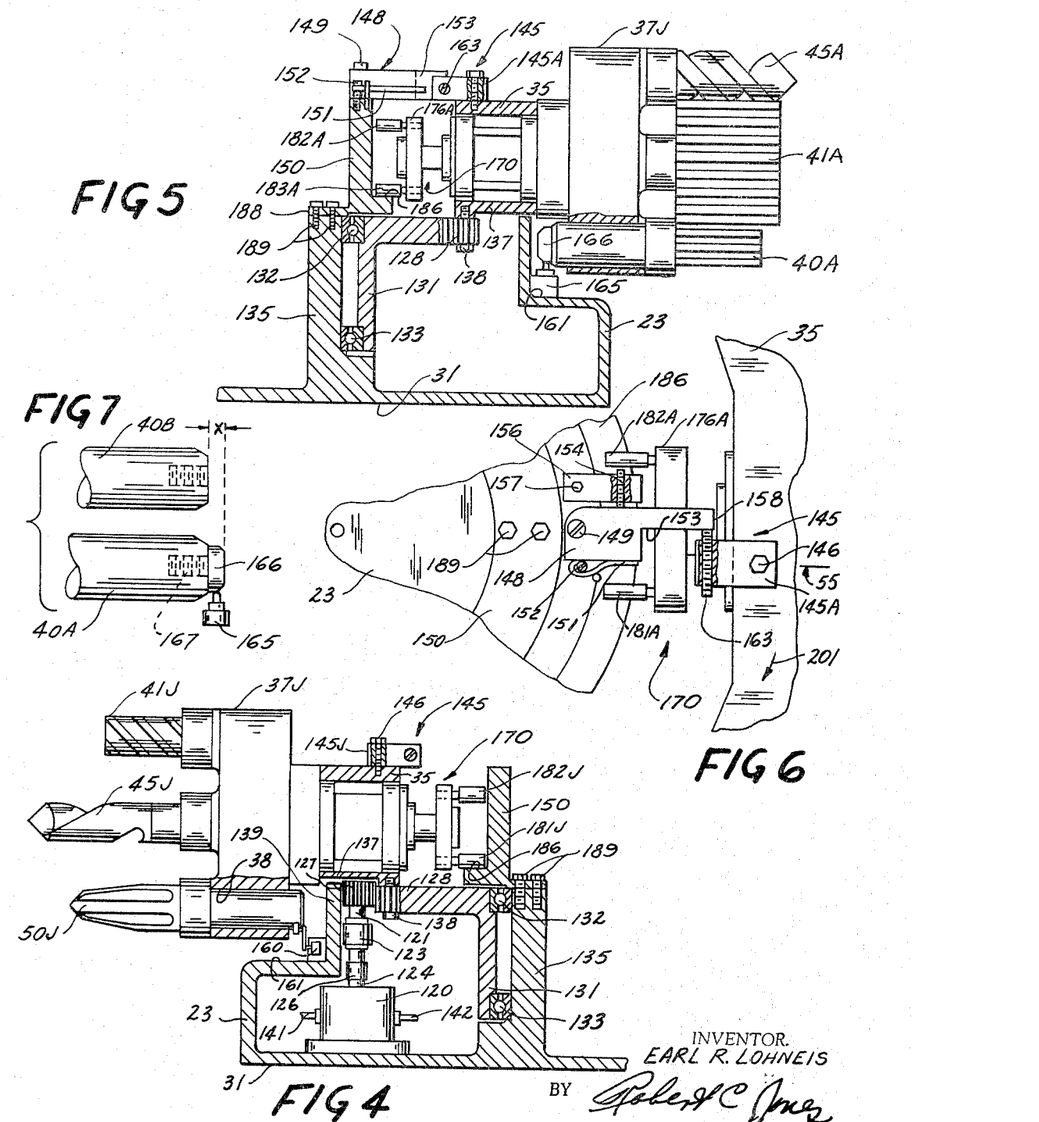
FIG. 4 is enlarged detail view in vertical section taken along the plane represented by the line 4—4 in FIG. 2 showing the drum drive motor arrangement and the tool present switch.
FIG. 5 is an enlarged detail view in vertical section taken along the plane represented by the line 5—5 in FIG. 2 showing a first tool in ready position in a turret at the tool change station actuating the first tool switch.
FIG. 6 is a fragmentary plan view of the supporting housing and drum showing the positive stop arrangement for effecting the precise position of a turret at the tool change station.
FIG. 7 is a fragmentary view of toolholders illustrating the difference in length of toolholder shanks to provide a coding for identifying a first tool relative to other tools of a group of tools.

To position a turret in the tool change station 55 for an interchange of a tool with a tool carried by the spindle, the tool storage magazine or drum 35 is rotatably driven in a selected direction by a hydraulic motor 120, FIGS. 4 and 9, that is operatively disposed in the housing 23. To this end, a drive shaft 121 is rotatably supported in antifriction bearings that are carried in a horizontally inwardly extending bracket 123 integrally formed with the front wall of the housing 23. The drive shaft 121 is operatively connected to be driven by the output shaft 124 of the hydraulic motor, being coupled thereto by a coupling 126. The upper end of the drive shaft 121 is provided with a pinion 127 that is disposed in constant meshing engagement with a large circular gear 128 which is supported for rotation about an upwardly extending hub 135 integrally formed with the housing 23. The gear 128 serves also as a supporting member for the drum 35 and the individually indexable turrets 37. To this end, the gear 128 is provided with a hub 131 which is rotatably disposed on the outer races of a pair of bearings 132 and 133 that are mounted around the vertical hub 135 of the base 23.

The magazine or drum 35 is a circular ring member having its outer periphery machined to provide ten flat surfaces all of equal length and each of which would constitute a chord of ten equal segments of the ring. The ring or drum 35, as previously mentioned, is carried by the gear 128 for rotation with it, being secured thereto on a circular bracket 137 which, in turn, is secured to the upper surface of the gear 128 in concentric relationship by means of a plurality of bolts 138. The arrangement is such that the vertical flat surfaces formed on the periphery of the drum 35 are arranged to extend outwardly beyond the peripheral surface of the upper reduced diameter portion of the housing 23. To rotatably drive the drum 35 in a clockwise direction, as indicated by the directional arrow 201 in FIG. 2, pressure fluid is supplied to the motor 140 via a line 141, FIGS. 4 and 9, while a line 142 is simultaneously connected to exhaust. On the other hand, when the line 141 is connected to exhaust and the line 142 is connected to supply pressure fluid to the motor 120, the motor will operate to effect counterclockwise movement of the drive gear 128 and thereby effect a counterclockwise movement of the drum 35.

Figure 2:
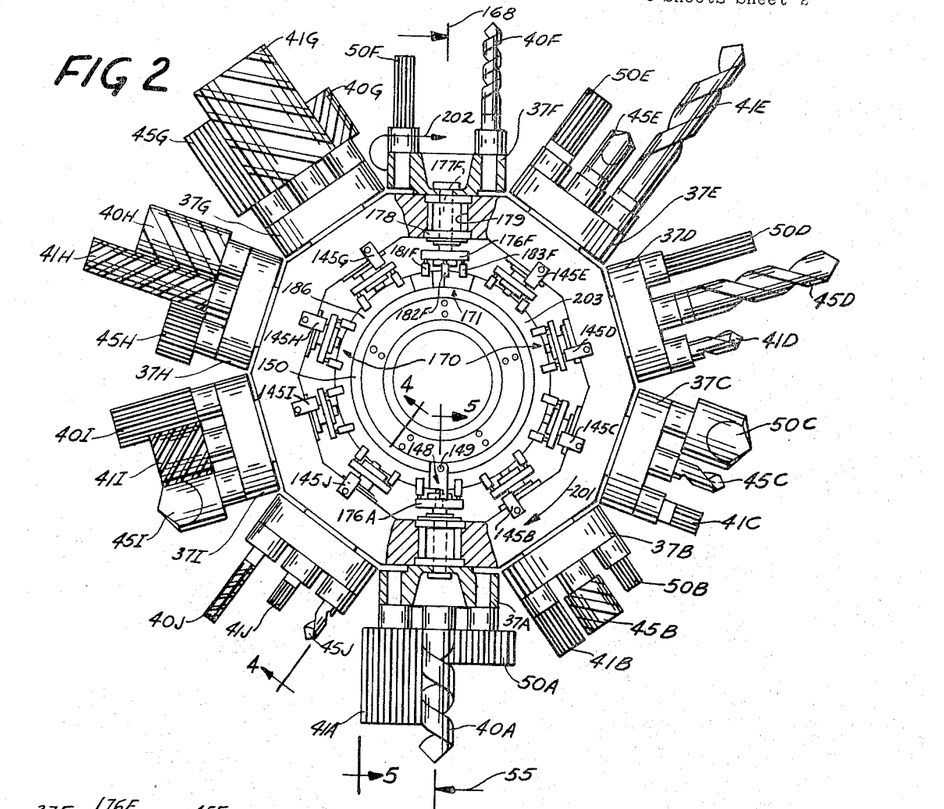
FIG. 2 is a plan view of the tool storage magazine showing the arrangement of all of the tool storage turrets and with parts broken away to show the arrangement for rotatably supporting a turret, as well as the means for effecting the required index movement of the turrets.

As shown in FIGS. 1 and 2, the drum 35 is indexed in a clockwise direction, as indicated by the directional arrow 201, and operates to position a tool storage turret in the tool change station 55. The tool change station is the final position in which a tool is held for subsequent pickup by the carrier arm 59 and transferred to the spindle 29. Each of the tool storage turrets 37A to 37J, inclusive, are supported by the drum 35 for bodily movement with the drum for successive positioning at the tool change station 55. In addition, the turrets are also individually indexable relative to the drum. The independent indexing movement of the turrets operates to locate a socket and thereby a tool stored therein at the lowermost point of the circle which the axes of the sockets trace as they are moved in their path of travel by the indexing movement of the associated turrets. This lowermost position to which the sockets are indexed is directly below the axis about which a turret rotates and a tool, such as the tool 40A in the turret 37A when in this position, is referred to as being in a ready position.

As depicted in FIG. 1, the arrangement is such that the axis of a turret, the axis of a tool stored in the lowermost positioned tool storage socket thereof, the axis of the shaft 63 about which the arm 59 rotates, and the axis of the spindle 29, are all disposed in the same vertical plane. Thus, a tool in the ready position in the tool change station 55 can be, by operation of the arm 59, withdrawn from its storage in the turret and transferred to the spindle 29. In the particular illustrative embodiment herein shown, each storage turret 37 is provided with four storage positions or bored openings 38, each of which is adapted to receive a tool in storage. Thus, each of the openings 38 are angularly spaced 90° apart, and therefore, when a turret is in a tool change station 55, two tools therein will be stored with their axes in the same horizontal plane, while the other two tools will be stored with their axes in the same vertical plane, and the lowermost tool thereof will be the tool which is desired to be placed in the spindle 29 for the next succeeding operation. It is to be emphasized, however, that while the turrets herein shown are illustrated as having four storage positions, the number of storage positions in each turret may be increased or decreased as desired.

Selective indexable movement of the drum 35 is controlled by apparatus best shown in FIGS. 4, 5 and 6, which includes positioning apparatus in addition to the hydraulic motor 120 and the associated drive mechanism previously described. To selectively and accurately position each tool supporting turret 37 in the tool change station 55, the drum 35 is provided with a plurality of equally spaced dogs, generally identified by the reference numeral 145, each of which is secured to the top surface of the drum 35 by means of a bolt 146. The individual dog 145 associated with a particular turret is identified by the general reference numeral followed by a letter suffix which is the same as is used to identify the associated turret. Thus, a dog associated with the turret 37A is particularly identified by the reference numeral 145A, as shown in FIGS. 5 and 6. Referring again to FIG. 2, the dogs 145 are carried in bodily spaced relationship to each other, and each dog is located in predetermined position relative to a respective one of the turrets 37. As the drum 35 is rotated in a clockwise direction, as indicated by the directional arrow 201 in FIGS. 2 and 6, for moving the turrets 37A to 37J, inclusive, into the tool change station 55, each of the associated dogs successively engage a spring biased lever or stop 148 that is pivotally secured to the upper surface of a circular turret position control member 150 by flanged pivot screws 149. A spring 151 having one end attached to a pin 152, that is also secured in the upper face of the circular control member 150, has its opposite end disposed in engagement with the side of the stop 148 in a manner to exert a biasing force upon the stop to urge the lever or stop 148 in a counterclockwise direction about the pivot pin 149, as viewed in FIG. 6. The stop 148 is provided with a vertical side face 153 which is normally disposed in the vertical plane which includes the axes of the associated turret, the tool in the ready position, the shaft 63 and the spindle 29. To limit the counterclockwise movement of the stop 148 and also to effect a slight adjustment of the stop for precisely adjusting the position of the vertical surface 153, an adjustable limiting screw 154 is provided. As shown in FIG. 6, the limiting screw 154 is threadedly engaged in a bracket 156 that is also secured to the top surface of the control member 150 by means of a screw 157.

As described previously, the indexable rotation of the magazine or drum is normally in a clockwise direction, indicated by the directional arrow 201 in FIGS. 2 and 6, with the final positioning movement of the drum being in a limited counterclockwise direction to effect the precise positioning of a turret in the tool change station 55. As the drum 35 is indexed in a clockwise direction for positioning a turret, such as the turret 37A in the tool change station 55, the dog 145A associated with the turret 37A will engage the back face of the stop 148. Upon the continued movement of the drum 35 in a clockwise direction, the dog 145A will be moved out of engagement with the stop 148. Thereupon, the spring 151 will immediately operate the pivotal movement of the stop 148 in a counterclockwise return movement to again position it in a tool change station stop position. Thereafter, the inwardly extending end of the tool 40A stored in the turret 37A will be in a position to actuate a tool present switch 160 which operates to effect a reversal in the direction of rotation of the drum 55.

Actuation of the tool present switch 160 will reverse the operation of the hydraulic motor 120 so that it operates to effect the counterclockwise movement of the drum 35 for positioning the turret 37A in the tool change station 55. Movement of the drum 35 in a counterclockwise direction will continue until an adjusting screw 163 adjustably disposed in the dog 145 engages the vertical face 153 of the stop 148. With the screw 163 in engagement with the vertical face 153 of the stop 148, the particular associated turret, such as the turret 37A with which the dog 145A is associated, will be located in the tool change station 55 wherein the axis of the lowermost tool 40A, which is in the ready position, is positioned in a vertical plane which includes the axes of the shaft 63 and the spindle 29, in position to be engaged by a grip of the tool change arm 59 when it is operated in a tool changing operation. The motor 120 will continue to operate to urge the drum 35 in a counterclockwise direction so that the turret is positively maintained in the tool change station 55. As shown in FIGS. 1 and 4, the tool present switch 160 is secured on the upper surface of an angular horizontally extending surface 161 of the housing 23. The tool present switch 160 is bodily spaced from the tool change station 55 to the left thereof a distance sufficiently far enough to insure that a dog 145 will be moved angularly a distance to effect the disengagement of the dog from the stop 148 prior to the tool switch being actuated.

Reference has heretofore been made to tools which are stored in the turrets 37. It is to be understood that the term "tool" applied to a tool per se or to a tool and a toolholder combination. In either case, the shank of the tool, such as the tool 50J, in FIG. 4, in the turret 37J extends outwardly of the turret rearwardly thereof so as to present a projecting portion which, when in the lowermost positioned tool storage socket, will actuate the switch 160 to indicate the presence of a tool in the ready position of the particular turret.

A simplified index control system for the storage magazine is provided wherein the first tool of a group of tools is identified, and thereafter, the drum is sequentially indexed to present the remaining turrets in sequential order to the tool change station for the purpose of presenting the remaining tools of the group in the order required. To identify and locate the first tool of a group of tools so as to position it in the tool change station 55, only the first tool of a group of tools required for machining a particular workpiece is provided with coded identifying means.

To identify a first tool from the other tools of a group, a simple code means is provided in that the shank of the tool of the first tool is extended by means of an extension body 166, as shown in FIGS. 5 and 7. The extension body 166 is provided with a stud portion 167 that threadedly engages in an axial bore formed in the end of the tool shanks. Thus, any one of the tools may be utilized as a first tool if so desired and it can be easily and quickly coded by means of the extension body 166. As shown in FIG. 7, the extension body 166, when attached to the end of the shank of a tool, such as the tool 40A, operates to extend the length of the tool shank by an amount "X" beyond the end of the shank of an uncoded tool, as represented by the shank of the tool 40B. Thus, the tool 40A with the extension 166 thereon and when in the ready position in the tool change station 55 will be operable to actuate a first tool limit switch 165 that is positioned at the tool change station 55. The first tool switch 165 is operably disposed so that its actuating plunger is disposed with its axis in the vertical plane of the tool change station 55 and in position to be actuated by the extended length of a coded first tool. Only a first tool of a group of tools will actuate the first tool switch 165 because it is the only tool of the group that will be provided with a shank extension body 166. When the first tool switch 165 is actuated, it indicates that a subsequent tool interchange operation may be effected and establishes control conditions for subsequent operations. After the first tool switch is actuated, the drum 35 will be continued to be moved in a clockwise direction moving the tool 40A to the left of the tool change station 55, as viewed from the front of the machine in FIG. 1. When the drum 55 has been rotated in a clockwise direction an angular distance sufficient to move the dog 145A past the pivotal stop 148 so that the stop is released, the tool 40A will be positioned so that it actuates the tool present switch 160. It will be understood that as the drum 35 is initially rotated to position the succeeding turret 37A in the tool change station 55, the turret 37J will be moved out of the tool change station. Thus, the tool 50J in the ready position of the turret 37J will actuate and deactuate the tool present switch 160 prior to it being actuated by the tool 40A. However, this first actuation and deactuation of the switch 160 has no effect and the rotation of the drum 35 in a clockwise direction will continue until the switch 160 is actuated a second time by the tool 40A. When the tool present switch 160 is actuated the second time, it will effect the reverse or counterclockwise rotation of the drum to precisely position the turret 37A in the tool change station 55, as previously mentioned. With the tools loaded in the storage turrets as shown, it will be apparent that clockwise rotation of the drum 35 will advance the respective turrets to the tool change station 55 so as to present the tools in the order of their use. Since the first tool of a group of tools is the only coded tool, the initial tool preparation is greatly simplified and the system also affords an extremely high degree of flexibility since a group of tools can comprise any number of tools within the total capacity of the machine which is limited only by the number of storage sockets available in the individual turrets 37.

After a machining cycle has been started, the clockwise indexing and counterclockwise positioning movements described occur while a work operation is being performed. Thus, at the completion of a machining operation performed with the tool in the spindle, the next required tool has already been indexably advanced to the tool change station 55 and is in a ready position in preparation for the next tool interchange operation. It is apparent, therefore, that since the tools are to be utilized in sequence and the sequential order of tools are arranged in sequential turrets, each tool, as it is positioned in the tool change station 55, must be located in a ready position, which is the lowermost position to which a storage socket 38 of a turret can be moved. Thus, each turret must be indexed one-quarter revolution after it leaves the tool change station 55 and prior to it again being positioned at the tool change station. This becomes more clearly apparent with reference to FIG. 8, wherein the magazine 35 is shown in developed view so that the turrets 37A and 37J appear in a horizontal line. For the purpose of this description, it will be assumed that all the tools 40A to 40J are tools of one group. These tools are stored so that the first tool 40A of the group is in the lowermost socket of the turret 37A, and the second, third, fourth and fifth tools, 40B, 40C, 40D and 40E, are inserted and stored in the lowermost positioned sockets of the turrets 37B to 37E respectively. The next succeeding turret 37F is shown as being rotated one-eighth of a revolution because, with the drum 35 positioned as depicted, the turret 37F is in a position hereinafter referred to as the turret index station 168 which is located diametrically opposite the tool change station 55. Thus, as the turret 37F is moved into the index station 168, an indexing movement is automatically initiated, and when the drum 35 stops to locate the turret 37A in the tool change station 55, the turret 37F will be located in the turret index station 168 and will have been rotated 45°, which is only one-half of a complete index movement. The full index movement of the turret 37F will be completed upon the next indexing movement of the drum 35 to move the adjacent turret 37B into the tool change station 55. Thus, one-half of the incremental one-quarter revolution of the turret is completed as the turret moves into the index station and the remaining one-half of the incremental one-quarter revolution is completed as the turret moves out of the index station.

Figure 8:
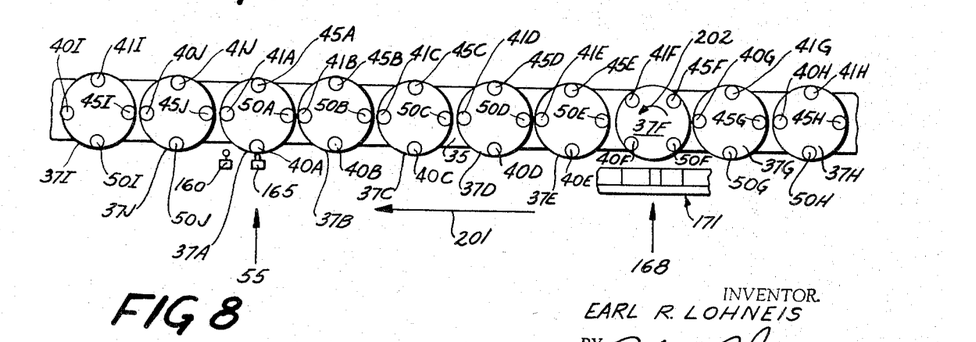
FIG. 8 is a schematic developed view of the tool storage drum showing the storage turrets with respect to the tool change station and the turret index station; and, FIG. 9 is a schematic view of the hydraulic circuit of the machine and incorporating a schematic showing of mechanism associated with the tool changer and the movable stop.

As viewed in FIG. 8, the turret 37F, in which the tool 40F is stored, is angularly orientated so that the tool 40F is in a position disposed at an angle which is displaced 45° from a horizontal and a vertical plane. Therefore, when the drum 35 is again operated in an indexing movement in a clockwise direction, indicated by the directional arrow 201 in FIG. 2, or to the left as viewed in FIG. 8, the turret 37F will be moved out of the turret index station 168. In this movement, the remaining one-half of the full index movement will then be completed in a counterclockwise direction, as viewed in FIG. 8, thereby moving the tool 40F into a lowermost ready position for subsequent positioning at the tool change station 55. This 90° of indexing movement is imparted to each and every turret once in every revolution of the drum 35. It is apparent, therefore, that the drum 35 is advanced in ten incremental steps in one revolution and each incremental step thereof positions a turret in the tool change station 55. Likewise, for each incremental advancement of the drum 35, the individual turrets 37, moving through the turret index station 168, are rotated 90° for locating a tool at the lowermost ready position. When the drum 35 has been indexed one complete revolution, the first ten tools 40A to 40J will have been utilized by the spindle 29 and the eleventh tool 41A in the turret 37A will have been positioned in the lowermost ready position and at the tool change station 55 in a position to be engaged by the arm 59.

Figure 3:
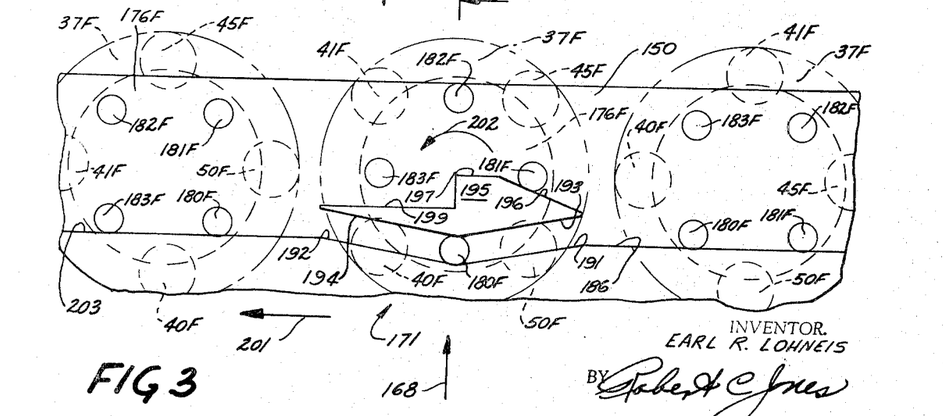
FIG. 3 is a fragmentary view of the turret indexing means showing the cam track arrangement and an index follower mechanism arrangement associated with a turret, the index follower mechanism being depicted in three different altitudes of relative cam track indexing to illustrate a complete indexing movement.

To effect the automatic indexing movement of the individual turrets 37, each turret is provided with a cam follower mechanism 170 which, in cooperation with a cam portion 171 of the circular guide 150 that is located at the index station 168 directly opposite the tool change 55, automatically effects 90° of indexing movement of each turret 37 as they move with the drum 35. Each fol-lower mechanism 170 associated with each turret is identical and a description of one of such mechanisms will apply to all. The cam follower mechanism 170 associated with the turret 37F, shown in FIG. 2, comprises a circular plate 176F which is keyed and secured in a well-known manner to the inner extending end of a shaft 177F that is journaled in bearings 178 carried within a bore 179 formed in the drum 35. The shaft 177F extends outwardly from the drum 35 with the turret 37F being mounted thereon for rotation with the shaft. Thus, a rotational movement that is imparted to the circular plate 176F will, in turn, be transmitted to the shaft 177F, and in turn, to the turret 37F. The circular plate 176F is provided with four cam rollers 180F to 183F, inclusive, show in FIGS. 2 and 3, which are rotatably supported on longitudinally extending shafts that are secured in the plate 176F adjacent the periphery thereof and in angular spaced relationship. The turret 37F and the plate 176F are disposed in concentric relationship, with the cam rollers 180F to 183F, inclusive, thereof being angularly spaced apart the same distance as are the sockets that are formed in the associated turret 27F, but the positions of the rollers are angularly displaced 45° relative to the position of the turret sockets. With the turret 37F positioned, wherein the tools 40F and 45F carried thereby are in the same horizontal plane and the tools 41F and 50F are in the same vertical plane, as depicted at the right of FIG. 3, the two lowermost cam rollers 180F and 181F, associated with the circular plate 176F, are disposed to roll upon a horizontal circular surface 186 formed on the circular guide member 150. The guide member 150 is provided with an inwardly extending annular flange which is mounted in concentric relationship on the upper surface of the hub 135 of the housing 23, as depicted in FIGS. 4, 5 and 6, being secured in operative position by means of a plurality of bolts 189. The arrangement is such that the guide member 150 is stationary while the circular plate 176F is movable bodily relative to it in a circular path of travel.

FIGURE 3 is a developed view of the guide member 150 showing a portion thereof, which includes the cam mechanism 171 and a portion of the guide member on either side of the turret index station 168. The showing in FIG. 3 is made with the viewer standing at the rear of the machine at the turret index station 168 and with the turret 37F and the cam follower plate 176F being depicted by broken lines. Therefore, in FIG. 3, the directional arrow 201 indicates the direction of movement of the drum 35 in an indexing movement, while the directional arrow 202, shown on the face of the plate 176F, indicates the rotational direction of index movement of the plate 176F. Thus, as the drum 35 is moved in an index movement in a clockwise direction, as viewed in FIG. 2, or from right to left as viewed in FIG. 3, the turret 37F will be moved bodily into the turret index station 168. As the turret 37F moves bodily with the drum 35, the two rollers 180F and 181F remain in engagement with the annular guide surface 186 of the guide member 150 and operate to retain the cam follower plate 176F and thereby the turret 37F in the depicted position to prevent inadvertent rotational movement of the turret.

As the turret 37F approaches the index station, the leading cam roller 180F will engage with the camming mechanism 171 that is disposed at the index station 168 for effecting the 90° indexing movement of the turret. At the index station 168, as shown in detail in FIG. 3, the guide surface 186 is provided with a downwardly inclined surface 191 and an upwardly inclined surface 192 which cooperate with complementary surfaces 193 and 194, respectively, that are formed on the undersurface of a projection 195 that extends outwardly from the outer periphery of the guide member 150 to overlie the surface 186 to form a trackway as shown. The projection 195 is provided with an upwardly inclined guide surface 196 which terminates at a horizontal surface 197. The horizontal surface 197 is terminated at the center of the index station to provide a clearance for the arcuate swing of the cam roller 181F as the plate 176F is forced to rotate in a clockwise direction, as viewed in FIG. 3, by operation of the cam roller 180F moving in the trackway formed by the spaced guide surfaces 191 and 193. In terminating the horizontal surface 197 of the projection at the middle of the index station, the left-hand portion of the projection 195 is relieved in a manner to provide a lower horizontal surface 199. Thus, as the turret 37F approaches the turret index station 168, the leading cam roller 180F will engage in the downwardly inclined trackway formed by the complementary surfaces 191 and 193.

As the drum 35 continues its leftward movement, FIG. 3, the cam roller 180F, following in the downwardly inclined trackway, will act as a crank forcing the plate 176F to rotate about its axis and thereby effect the rotation of the turret 37F in a counterclockwise direction, as indicated by the directional arrow 202 in FIG. 3. As the plate 176F is rotated in a counterclockwise direction, the roller 181F engages and rides on the upwardly sloping surface 196 of the projection 195. When the drum 35 has rotated to locate a succeeding turret in the tool change station 55, such as the turret 37A, the turret 37F will be positioned in the index station 168 directly opposite the tool change station and the rollers 180F to 183F will be disposed relative to the projection 195, as depicted in FIG. 3, with the cam follower roller 180F being positioned at the lowermost point of the trackway. Under this condition, the tools 40F, 41F, 45F and 50F carried by the turret 37F, will be disposed as indicated, in positions that are 45° displaced from the positions in which they were located at the start of the indexing movement of the drum. The turret 37F has thus been made to rotate one-half of the required 90° of index movement and the completion of such index movement will occur when the drum 35 is next moved to locate a different succeeding turret in the tool change station 55. Therefore, when the drum 35 is again rotated in an index movement, the turret 37F moving with the drum will also be rotated in a counterclockwise direction relative to the drum. This is true, because as the plate 176F and turret 37F move with the drum 35, the roller 180F tracking in the upwardly inclined portion of the trackway formed by the complementary coacting surfaces 192 and 194 will again act as a crank forcing the plate 176F to rotate in a counterclockwise direction. As the movement of the drum 35 continues from right to left as viewed in FIG. 3, the rotational movement of the turret 37F in a counterclockwise direction also continues until such time as the roller 183F is moved into engagement with the horizontal surface 203, which is a continuation of the surface 186.

When the drum 35 has completed its indexing movement, to move the succeeding turret into tool change station 55, the cam follower plate 176F associated with the turret 37F will have been rotated so that the rollers 180F and 183F are both in the same horizontal plane in engagement with the surface 203. In this position, the turret 37F has been rotated a complete 90° of indexing movement so that the tool 40F carried thereby is located in the lowermost or ready position to be engaged by the tool change arm 59 upon subsequent movement of the turret 37F into the tool change station 55.

A hydraulic circuit for supplying pressure fluid to control the operation of the machine tool is schematically illustrated in FIG. 9. As there shown, an electric motor 220 is connected to drive a hydraulic pump 221 which operates to withdraw hydraulic fluid from a sump 222 through a conduit 223 and discharges the fluid under pressure into a main supply conduit or line 224. A pressure relief valve 226 is connected in parallel with the pump 221 to conduits 223 and 224 to prevent excess pressure from developing in the supply lines.

The hydraulic circuit illustrated will be described in conjunction with a typical tool interchange cycle. It will be assumed that the drum or magazine 35 is at rest and that the turrets thereof are positioned, as shown in FIG. 1, wherein the turret 37A with the first tool 40A is in the tool change station 55. It will also be assumed that a tool 50K, which is the last tool of the previous group of tools, is in the spindle 29 and a work operation has been completed. It will be further assumed that power to the machine is off, and under this condition the motor 220 is not operating, and various solenoids associated with the various valves are all deenergized. With these conditions existing, the collet 106 is in tool clamping engagement. Also, the tool change arm 59 is in a retracted position and at a parked position, as depicted in FIGS. 1 and 9.

To initiate operation of the machine, both a control circuit (not shown) and the pump motor 220 are energized by momentarily depressing a start switch 240, which is shown as being mounted in a control box 241 disposed on the right side of the machine, depicted in FIG. 1. With the start button switch 240 momentarily depressed, the control circuit associated with the machine will be energized, as well as the pump motor 220. As a result, the solenoid 242 associated with a fluid control valve 243 is energized and effects the operation of the valve so that it directs pressure fluid from a branch supply line 245 into the line 142 which is connected to one side of the hydraulic motor 120. Fluid supplied to the motor 120 via the line 142 operates to urge the magazine 35 in a counterclockwise direction, as viewed in FIGS. 1 and 2, so that the dog 145A is retained in abutting engagement with the pivotal stop 148 thereby positively retaining the turret 37A in the tool change station.

With the initial conditions in the control circuit established, an operating cycle will be initiated by momentarily depressing the tool change cycle start button 250, which is also located in the control box 241 on the side of the machine. Since the tool 40A is a first tool, it will have the extension 166 attached to it, and as a result, the first tool switch 165 is actuated and subsequent operation of the various operating mechanisms can be initiated. The momentary depressing of the tool change cycle start button 250 will also effect the initial energization of a solenoid 255 associated with a fluid directional control valve 256 so that the valve is operated to direct pressure fluid from the branch supply line 245 into the line 102 and thence to a spindle brake mechanism 101 so that the brake mechanism is operated to apply a brake to the spindle 29 to prevent its rotation. At the same time, the drive clutch mechanism 103 associated with the spindle is deactuated to interrupt the drive thereto.

The momentary actuation of the tool change cycle start button switch 250 also effects the energization of a solenoid 269 associated with the directional control valve 270. The energization of the solenoid 269 of the valve 270 effects the operation of the valve for directing pressure fluid from the branch supply line 244 through the valve and into a connected line 272 which, in turn, is connected to the rod end of the cylinder 81A. The pressure fluid supplied to the rod end of the cylinder 81A operates to maintain the tool change arm 59 in a retracted horizontal position. With the pressure fluid supplied to the rod end of the cylinder 81A, the opposite end of the cylinder 81A, or left end thereof as viewed in FIG. 9, is connected to drain via the interconnected lines 84 and 83 which, by operation of the valve 270, communicate with the branch return line 262. Simultaneously therewith, the cylinder 91A associated with the movable stop 70 is also connected to drain via the connecting line 96 that is in communication with the line 83. The combined exhaust fluid flows through an adjustable flow regulating valve 273 interconnected in the line 262 which operates to regulate the rate at which the arm is moved in an extending and retracting movement.

Simultaneously, with the energization of the solenoid 269 associated with the valve 270, a solenoid 274 associated with a control valve 275 is energized to effect the operation of the valve 275 to direct pressure fluid obtained from a branch supply line 277 into a line 278 that is in communication with an inlet port of the motor 78. The pressure fluid supplied to the motor 78 via the line 278 will effect the operation of the motor for rotating the tool change arm 59 in a clockwise direction, as viewed in FIG. 1, to move the arm from its horizontal parked position to a vertical tool engaging position. As the motor 78 operates to rotate the arm 59 in a clockwise direction, exhaust fluid from the motor 78 will flow into a connected line 279 and will be directed by the valve 275 into a branch return line 281, with the exhaust fluid flowing through a flow regulating valve 282 that is adjustable so as to vary the rate of discharge therethrough so that a predetermined rate of rotary movement of the arm 59 may be established as desired.

When the tool change arm 59 has rotated to a vertical tool engaging position wherein the grips 61 and 62 have grasped the tools 40A and 50K, respectively, a limit switch 285, shown schematically in FIG. 9, will be actuated. Actuation of the limit switch 285 is accomplished by one or the other of a pair of cams 286 and 287 carried in diametrically opposite relationship on the peripheral surface of the drive sleeve 74 for rotation therewith. The limit switch 285 is disposed within the housing 23 in position so as to be actuated by either the cam 286, or on alternate cycles of rotation of the arm 59 by the cam 287. Thus, in the initial rotation of the tool change arm 59 from a horizontal parked position to a vertical tool engaging position wherein the grip 61 will engage with the tool 40A, the cam 286 will actuate the limit switch 285.

With the arm in a vertical position, the limit switch 285 will be actuated either by the cam 286 or by the cam 287 and when so actuated, operates to control the operation of the collet 106 to operate it in an unclamping operation. The actuated limit switch 285 also operates to effect the deenergization of the solenoid 269, and simultaneously therewith, energization of a solenoid 271, both of which are associated with the control valve 270. With the solenoid 271 of the valve 270 energized, the valve will operate to direct the pressure fluid from the branch supply line 244 to the left end of the cylinder 81A of the actuator 81 via the interconnected lines 83 and 84. Pressure fluid supplied to the left end of the cylinder 81A will effect the operation of the actuator 81 to move the rod 82 associated with the cylinder outwardly to the right, as viewed in FIG. 9. The outward movement of the rod 82 effects the simultaneous outward or rightward movement of the arm shaft 63 and also of the movable stop shaft 89. Thus, the arm 59, which is in a vertical position in engagement with the tools 40A and 50K, is moved outwardly away from the front face of the machine column withdrawing the tool 40A from the tool storage position in the turret 37A and the tool 50K from the spindle 29. With the actuator 81 operating to effect the outward movement of the arm 59, exhaust fluid from the rod end of the cylinder 81A flows into the connected line 272 and by operation of the valve is directed into the return line 262 and is returned to the reservoir via a main return line 263. The rate of flow of the exhaust fluid flowing in the line 262 is controlled by an adjustable regulating valve 272 set to establish a desired flow rate therethrough to control the rate at which the arm is moved axially.

As pressure fluid is supplied to the left end of the actuator 81, the pressure fluid in the line 83 will also flow into the connected line 96 and be directed thereby into the cylinder 91A to act on the piston portion of the rod 89 that is disposed within the cylinder 91A to bias the rod 89 outwardly or rightwardly, as viewed in FIG. 9. As previously mentioned, pressure fluid supplied to the actuator 91 will condition the shaft 89 for further rightward or outward movement after the arm 59 has been rotated in a clockwise direction from a vertical extended position which movement will release the stop 70. When the arm 59 is in its fully extended position and rotated in clockwise direction, as viewed from the front of the machine, in a tool interchange movement, the stop 70 is released and the rod 89 will move an additional amount to the right, as viewed in FIG. 9, so that the head 88 extends into the path of rotation of the arm 59 for subsequent engagement by the arm.

When the arm 59 is in fully extended position, a cam 293, schematically shown as being attached to the shaft 63, is moved into position to engage and actuate a limit switch 294. Actuation of the limit switch 294 effects the energization of the solenoid 274 associated with the control valve 275 so that it is operated to again direct pressure fluid from the branch supply line 277 into the line 278 for supplying the hydraulic motor 78 with pressure fluid to cause it to operate in a direction to effect 180° of rotational movement of the arm in a clockwise direction, as viewed from the front of the machine. The rotation of the arm 59 in a tool interchange movement will continue until the arm abuts the extending head 88 of the movable stop 70 which stops the rotary movement of the arm. Thus, the position of the two grips 61 and 62 have been interchanged so that the tool 40A in the grip 61 is now axially aligned with the spindle 29 while the grip 62 with the tool 50K is axially aligned with the empty storage socket presented by the turret 37A and from which the tool 40A has been withdrawn.

With the arm 59 rotated 180° in a clockwise direction to effect an interchange in the position of the grips 61 and 62 and thereby the tools carried by the grips, the limit switch 285 is again actuated by one or the other of the cams 286 or 287 to effect the next sequential step in a tool change cycle of operation. This next step is to effect retraction of the arm 59 towards the face of the column 20 thereby inserting the tool 40A into the spindle 29 and to insert the tool 50K into the empty storage socket presented by the turret 37A. To this end, the actuated limit switch 285 will effect the deenergization of the solenoid 271 associated with the valve 270 and simultaneously therewith will effect the energization of the solenoid 269. The valve 270 is operated so that it directs the pressure fluid from the line 244 into the connected line 272 and thence to the rod end of the cylinder 81A of the actuator 81. The actuator 81 thereupon operates to effect a retraction of the arm 59. As pressure fluid is supplied to the rod end of the cylinder 81A, exhaust fluid from the opposite end of the cylinder is connected to drain via lines 84 and 83, and simultaneously therewith, the cylinder 91A is also connected to drain via the line 96 that is connected to the line 83. The combined exhaust fluid from the cylinder 81A and from cylinder 91A is directed by the valve 270 into the return line 262.

As the actuator 81 is operated to effect the inward movement of the arm 59, the cam 293 carried by the shaft 63 is moved out of engagement with the limit switch 294. This merely conditions the control circuit for the next sequence of operation. When the arm 59 is fully retracted another cam 296, depicted as being carried by the shaft 63 in spaced relation to the cam 293, is moved into position to actuate a limit switch 297 which will actuate the collet 106 into clamping engagement with the tool and effect counterclockwise rotation of the carrier arm 59 to disengage the carrier arm from the tools and rotate it to a parked position. During the counterclockwise rotation of the carrier arm 59, the solenoid 269 associated with the valve 270 is maintained energized so that the carrier arm 59 is retained in a retracted position as it is rotated to the parked position.

To rotate the tool carrier arm 59, 90° in a counterclockwise direction to its parked position, the solenoid 274 is deenergized and a solenoid 276 is simultaneously energized for effecting the operation of the valve 275 so that the branch fluid supply line 277 is connected to the line 279. Pressure fluid supplied to the line 279 is directed to the hydraulic motor 78 to effect its operation in a direction to rotate the arm 59 in a counterclockwise rotary movement. As the motor 78 operates to effect the counterclockwise rotation of the arm 59, exhaust fluid from the motor is directed into the line 278, and by means of the valve 275, is directed to the return line 281. The counterclockwise rotation of the arm 59 will continue until the arm engages the positive stop 67. As this occurs, a cam 298 carried by the drive sleeve 74 will be moved into engagement to actuate the limit switch 299. The limit switch 299, upon being actuated, will effect the deenergization of the solenoid 276 associated with the control valve 275 and valve 275 will thereupon be operated into a neutral position to interrupt the flow of pressure fluid to the hydraulic motor 78, with the arm 59 being disposed in a horizontal parked position against the positive stop 67. With the arm returned to the horizontal parked position after a first tool interchange operation, the positions of the grips 61 and 62 are now interchanged in that the grip 61 will be adjacent the right side of the machine as viewed from the front of the machine, while the grip 62 will now be adjacent the left end of the machine. The drive sleeve 74 is provided with a second cam 301 which is located on the peripheral surface of the sleeve diametrically opposite the cam 298. The cams 298 and 301 are disposed in position so that upon rotation of the sleeve 74 in one direction or the other, one or the other of the cams will actuate the limit switch 299 to terminate counterclockwise rotation of the arm 59. It is to be noted that one cam actuates the limit switch 299 during one interchange cycle of operation and that the other cam, spaced 180° apart therefrom, actuates the switch during an alternate cycle of operation.

The actuated limit switch 299 effects the deenergization of the solenoid 255 associated with the brake actuator valve 256 and the valve is operated to block the flow of pressure fluid to the brake mechanism 101. This will release the brake mechanism 101 so that the spindle 29 with the tool 40A secured therein is free to rotate. With the brake mechanism 101 released, the spindle drive clutch mechanism 103 is again engaged to reestablish the drive connection to the spindle 29.

With the spindle 29 being operated in a work operation with the first tool 40A, the magazine 35 is indexably rotated in a clockwise rotation to move the tool storage turret 37B, in which the next succeeding tool 40B is stored, into the tool change station 55 with the tool 40B in the ready position for engagement by the grip 62 of the tool change arm 59 in a subsequent tool interchange operation. The indexing movement of the magazine is effected by the actuation of the limit switch 299 which was accomplished when the arm 59 was rotated to the parked position, as previously described. The actuated limit switch 299 effects the simultaneous deenergization and energization of the solenoids 242 and 246, respectively, associated with the valve 243. With the solenoid 246 energized, the valve 243 is operated to connect the pressure fluid supply line 245 with the line 141 that is connected to the inlet port of the motor 120. The pressure fluid supplied to the motor 120 via the line 141 will effect the operation of the motor 120 for driving the drum 35 in a clockwise direction. As the motor 120 operates to effect the clockwise directional movement of the drum 35, exhaust fluid from the motor will flow into the connected line 142 and by operation of the valve, be directed through a flow regulating valve 264 and into the return line 252.

Since the next tool 40B to be utilized in the spindle 29 and therefore to be located at the tool change station 55 is not coded, the shank of the tool 40B does not have an extension 166. Thus, as the tool 40B moving with the turret 37B moves through the tool change station 55, it will not actuate the limit switch 165. At this time, however, it is not necessary that the limit switch 165 be actuated since it is only required that the first tool actuate this switch so that initial conditions in the control circuit are established for initiating a tool change cycle. As the tool storage turret 37B is moved through the tool change station 55 to a position to the left thereof, as viewed from the front of the machine, the dog 145B associated with the turret 37B, shown in FIG. 2, will engage the stop 148 causing it to pivot in a clockwise direction. The drum 35 will continue to rotate in a clockwise direction and the dog 145B will release the stop 148 whereupon it is moved by means of the spring 151 to its normal tool change station stop position depicted in FIG. 2. Thereafter, the tool 40B will engage and actuate the tool present switch 160 thereby interrupting the operation of the motor 120 to stop the clockwise directional movement of the drum 35.

It will be recalled that at the start of the cycle, the first tool 40A was in the tool change station 55, and since it was a first tool it had the code extension 166 thereon and thus actuated the first tool switch 165. The first tool switch 165 upon being actuated remains actuated until the control circuit is deenergized, either manually by actuation of a stop button switch 251, or automatically by means of a signal obtained from a tape (not shown). Thus, the control circuit is continuously conditioned to perform sequentially control functions that are required. As the magazine or drum 35 is initially rotated in an indexing movement to locate the succeeding turret 37B in the tool change station 55, the turret 37A with the tool 50K stored therein is moved out of the tool change station. In this movement, the tool 50K will actuate the tool present switch 160 and thereafter immediately release or deactuate the switch. However, the first actuation of the tool present switch 160 merely conditions this switch so that when it is actuated subsequently by the following tool 40B it will operate to interrupt the clockwise rotation of the drum 35. Thus, when the condition is obtained wherein the tool present switch 160 has been actuated twice and with the first tool switch 165 previously actuated, the solenoid 246 associated with the control valve 243 is deenergized. The control valve 243 now operates to interrupt the flow of pressure fluid to the motor 120 thereby stopping the clockwise rotation of the drum 35. Simultaneously, with the deenergization of the solenoid 246, the associated solenoid 242 is energized so that the valve 243 is operated to direct pressure fluid to the motor 120 to operate it in a reverse direction for rotating the drum 35 in a counterclockwise direction.

The rotational movement of the drum 35 in the reverse or counterclockwise direction will continue until the dog 145B, FIG. 2, is moved into engagement with the stop 148 which operates, as previously described, to locate the turret 37B in the tool change station 55 with the tool 40B in the ready position for subsequent transfer to the spindle 29. The motor 120 is maintained operative to urge the drum 35 in a counterclockwise direction thereby maintaining the tool 40B in a position for a subsequent tool transfer operation.

With the second tool 40B of the group of tools 40 located in the tool change station 55 and in the ready position to be engaged by the tool change arm 59 for an interchange movement, a complete tool change cycle has been accomplished. A second tool change cycle of operation will not again be initiated until the tool change button switch 250, FIG. 1, is again actuated to initiate the second cycle of arm movement to interchange the second tool 40B with the first tool 40A.

With the above-described arrangement, after the first tool of a group is inserted in the tool change position in the turret located at the ready station 55 thereby actuating the first tool switch 165, the drum 35 can be sequentially indexed to move the remaining tools of the group to the tool change station by successively advancing the turrets step-by-step so that each successive turret having the next successive tool is positioned at the tool change station. To accomplish this, only the first tool of a group of tools is coded and inserted in the lowermost socket or ready position socket of the turret at the tool change station. The remaining tools of the same group are then manually inserted in the lowermost positioned socket of the succeeding turrets in the sequence of their required use. If the tools in the group exceed five, then the sixth tool will be inserted into the socket of the sixth turret, counting in a counterclockwise direction, as viewed in FIG. 2, with the turret in the ready station 55 being counted as the first turret. Since, as viewed in FIG. 2, the sixth turret will be at the turret index station 168 and is rotated one-half of an incremental step, two of its sockets will be in an upper horizontal plane and the other two sockets will be in a lower horizontal plane. Thus, since the direction of rotation of the turret is the direction indicated by the directional arrow 202, the sixth tool of the group will be inserted in the left hand socket in the lower horizontal plane, as viewed from the rear of the machine. If the group of tools comprises a total of ten tools, then the operator moving in a counterclockwise direction around the machine, as viewed in FIG. 2, will insert the seventh to tenth tools inclusive in the turrets 37G to 37J inclusive in the sockets thereof which are located directly to the left of the axes about which the turrets rotate.

Assuming now that the storage magazine is to be provided with four groups of tools identified generally as 40, 41, 45 and 50, and that the groups 40, 41 and 45 will each include ten tools that are identified by the suffix letters A to J inclusive associated with the tool group identifying numeral, as shown in FIGS. 2 and 8. The last group of tools 50 is assumed to have eleven tools 50A to 50K inclusive. It will also be assumed that the tool groups are to be used sequentially in the order 40, 41, 45 and 50, with the tools in each group being used sequentially in the order of A to J inclusive. Under this assumed condition, the operator will insert the first tool 40A of the first group in the lowermost socket of the turret 37A, as depicted in FIGS. 1, 2 and 8, which position constitutes the tool ready position when the turret is located at the tool change station 55. The operator will also insert the last tool 50K of the last group of tools 50 in the spindle 29. The remaining tools, starting with the second tool 40B of the first group of tools, will be inserted in successive turrets and in sockets thereof, as depicted in FIG. 8. The next ten tools of the group of tools 41 will be in sequential order of use starting with the turret 37A. This same arrangement applies to the ten tools of the succeeding two groups of tools 45 and 50. This arrangement is necessary since each turret is indexed one-quarter revolution for every complete revolution of the drum 35. However, since turret indexing is accomplished in the index station which is located diametrically opposite the ready station, the turrets 37B, 37C, 37D and 37E have already been moved through the index station and thus the tools 40B, 40C, 40D and 40E stored in the turrets must be stored in sockets which are in the lowermost arcuate positions, hereinbefore referred to as a ready position, so that when these turrets are successively moved into the tool change station 55, the tools 40B to 40E inclusive will be in a tool interchange position. However, the turret 37F, which is shown in the index station, has been indexed only one-half of a full index movement, and therefore, the tool 40F will be stored in the lower left socket of the turret 37F, depicted in FIG. 8, so that upon completion of the index movement, the tool 40F will be in a tool ready position. Since the remaining turrets 37G to 37J inclusive are on the approach side of the turret index station 168, the tools 40G to 40J inclusive will be stored in sockets of the respective turrets which are in a mid-horizontal plane and to the left of the axes about which the turrets rotate, as depicted in FIG. 8. The tools of the other three groups of tools, namely 41, 45 and 50, are inserted in the respective turrets in sequential order of use similar to the tools 40. The first tool 41A of the second group of tools is stored in the socket which is to the left of the socket in which the tool 40A is stored. This same arrangement is continued for all tools of the second group with respect to the remaining turrets. The sequential arrangement of tool storage is started with the storage turret which is the tool change station 55 and with the socket thereof that is in the lowermost position. In this manner, the tools stored in the lowermost sockets of the turrets which have passed the index station 168 will all be in a proper initial tool ready position upon subsequent movement of the turrets into the tool change station 55. On the other hand, the tools stored in the turrets approaching the turret index station 168 and stored in sockets to the left of the axes about which the turrets rotate will be subsequently moved to proper ready position after the respective turrets have been moved past the turret index station.

The foregoing arrangement is equally effective for utilization with groups of tools wherein each group may have less than ten tools. Further, the storage magazine will accommodate groups of tools that may have any number of tools providing that the total number of tools of all groups does not exceed the total tool storage capacity of the magazine. The storage mechanism can also be used for groups of tools which do not utilize the total storage capacity of the magazine. This is readily apparent if an extreme condition is assumed wherein two groups of tools are to be utilized in two different work operations and each group includes three tools each, for a total of six tools to be stored in the exemplary forty tool capacity magazine depicted. With this assumed condition, the first tool of the first group will be inserted in the lowermost socket of the turret 37A in the tool change station and the second and third tools in the lowermost sockets of the second and third turrets 37B and 37C respectively. The first tool of the second group of tools will then be stored in the lowermost socket of the fourth turret 37D while the second tool of the second group will be stored in the fifth turret 37E. The third and last tool of the second group of tools will be placed in the spindle 29. Since the first tool of the first group of tools is in the ready position of the turret in the tool change station 55, the operator will depress the tool change cycle button switch 250 to initiate a tool change operation. As will be recalled, the initial step is a tool interchange operation and the arm 59 will operate to remove the first tool from the ready position of the turret 37A and simultaneously remove the last tool of the second group of tools from the spindle 29. The arm 59 will then operate to interchange the position of the two tools, inserting the first tool of the first group of tools into the spindle 29 while simultaneously inserting the last tool of the second group of tools into the storage socket from which the first tool of the first group was withdrawn. Thereafter, the magazine will index, moving the next turret 37B with the second tool of the first group in ready position into the tool change station 55 for subsequent transfer to the spindle 29. The tool positioning and interchange cycles will be continued until all tools of both groups have been utilized. However, when the third or last tool of the second group of tools has been transferred to the spindle 29 and the spindle is operating the tool, the drum 35 will be indexed to locate the first tool of the first group of tools in the tool change station 55. To accomplish this, the rotation of the drum 35 will continue to complete a first complete revolution and then will continue to rotate in a clockwise direction for three additional complete revolutions. This will serve to index each turret four times and the first tool, of the first group of tools now in storage in the turret 37B, will be angularly orientated into the ready position. Thus, on the next or fifth cycle of the drum 35 when the turret 37B is moved into the tool change station 55, the first tool, which is coded, will actuate the first tool switch 165 and thereafter will actuate the tool present switch 160 and thereby effect the operation of the motor 120 to reverse the rotational direction of the drum to position the turret 37B in the tool change station with the first tool in ready position. This is possible because the switch 160 does not count storage sockets, and therefore, is not affected by empty sockets as they move past the switch. The switch 160 operates to sense the presence of a tool, and when a tool is present, it actuates the switch 160 so that the drum rotation is reversed, as previously described. It is apparent that with the present arrangement, an extremely versatile storage magazine is provided which is capable of storing a large number of tools of small and large diameters in intermixed relationship.

An electrical circuit, of which the variously described limit switches are a part, has not been illustrated as it is not believed that such a showing is necessary for a full and complete understanding of the invention set forth herein. However, an electrical circuit, suitable for the machine shown, is set forth in detail in U.S. Patent No. 3,218,706 and entitled "Machine Tool With Tool Changer."

From the foregoing detailed description of the illustrative embodiment of the invention set forth herein to exemplify the present invention, it will be apparent that there has been provided an improved tool change mechanism in combination with a novel tool storage means.

Although the illustrative embodiment of the invention has been described in suitable detail for the purpose of disclosing a practical operative structure whereby the invention may be practiced advantageously, it is to be understood that the particular apparatus described is intended to be illustrative only and that the various novel characteristics of the invention may be incorporated in other structural forms without departing from the spirit and scope of the invention as described in the subjoined claims.

The principles of this invention having now been fully explained in connection with the foregoing description, I hereby claim as my invention:

1. In a tool storage apparatus for storing tools that are to be employed in the operating station of a machine tool which is provided with tool transfer means for transferring the tools between the storage apparatus and the operating station;
   an indexable magazine;
   a plurality of tool supporting members carried by said magazine for independent indexing movement relative to said magazine as well as for movement with said magazine so that each indexing movement of said magazine will move one of said tool supporting members into a tool change station, each of said tool supporting members carrying a plurality of tools for use in the operating station;
   a tool ready station located in the tool change station to present tools for withdrawal and transfer by the tool transfer means and to receive tools therefrom;
   means connected to actuate said magazine in its indexing movement for successively locating said tool supporting members in a tool change station; and,
   means connected to index each of said tool supporting members one increment of movement prior to their arrival at the tool change station so that each time a supporting member moves into the tool change station a different one of the tools in that tool supporting member is moved into the tool ready station so that the plurality of tools carried by said tool storage apparatus are moved sequentially into the tool ready station with each succeeding tool being carried by a different tool supporting member.

2. A tool storage apparatus according to claim 1 wherein said magazine is supported for rotary indexing movement; and,
   said tool supporting members are supported by said magazine for rotary indexing movement relative to said magazine about axes that extend radially from the axis of rotation of said magazine.

3. A tool storage apparatus according to claim 1 wherein said indexing means for said tool supporting member is actuated by the indexing movement of said magazine to index each of said tool supporting members one indexing movement before it is moved into the tool change station.

4. A tool storage mechanism as according to claim 1, including a sensing means actuated by the arrival of a tool in the tool ready station, said sensing means being operable when actuated to terminate the operation of said drive means so that it operates to locate the tool supporting member that is carrying the sensed tool at the tool change station with the sensed tool in ready position therein.

5. A tool storage apparatus according to claim 1 wherein said independent movement of each of said tool support members is effected automatically with the indexing movement of said magazine.

6. A tool storage mechanism according to claim 1 wherein said indexing means for said tool supporting members operates to index each tool supporting member one incremental step for each complete revolution of said magazine and the incremental movement of a tool supporting member serves to locate a tool carried therein in the tool ready position in which it can be engaged and transferred to the operating station by the operation of the tool transfer means when the tool support member is bodily moved into the tool change station by the indexing movement of said magazine.

7. A tool storage mechanism according to claim 1 wherein said means to index each of said tool supporting members includes a plurality of cam followers operably connected to each of said tool supporting members to effect rotation thereof; and,
   a cam member having a camming groove interposed in the path of travel of the cam followers as they move with their associated tool supporting members, the arrangement being such that a cam follower of a tool supporting member is moved through said camming groove as said tool supporting member moves bodily with said magazine and the movement of the cam follower through the camming groove operates to impart an incremental index movement to the associated tool supporting member to advance a tool carrying position thereof into a ready position,
   whereby a tool carried therein canb e engaged and transferred to the operating station by the tool transfer means upon the subsequent bodily movement of the tool supporting member into the tool change station.

8. A tool storage mechanism according to claim 1 wherein said means to index each of said tool supporting members includes a plurality of cam followers equal in number to the number of tool carrying positions in an associated tool supporting member;
   a circular guideway carried by the machine tool in position to be engaged by two cam followers of each tool supporting member as they move with said magazine, the engagement of the two cam followers with said guideway serving to restrain the associated tool supporting member from rotating relative to the magazine as it moves bodily therewith; and,
   a cam trackway interposed along said circular guideway in the path of travel of said cam followers that are engaged on said guideway, said cam trackway being operable to divert the leading one of the two cam followers associated with each tool supporting member that are in engagement with said guideway out of its normal path of travel so that it operates to index its associated tool supporting member an incremental step to advance a tool carrying position of the tool supporting member into a ready position in which a tool therein can be engaged and transferred to the operating station by the tool transfer means when the tool supporting member is moved bodily into the tool change station.

No references cited.

RICHARD H. EANES, JR., *Primary Examiner.*